United States Patent
Johnson et al.

(10) Patent No.: US 8,930,216 B1
(45) Date of Patent: *Jan. 6, 2015

(54) METHOD AND APPARATUS FOR ASSESSING CREDIT FOR HEALTHCARE PATIENTS

(71) Applicant: Search America, Inc., Maple Grove, MN (US)

(72) Inventors: Steven G. Johnson, Eagan, MN (US); Christopher G. Busch, Golden Valley, MN (US)

(73) Assignee: Search America, Inc., Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,528

(22) Filed: May 24, 2013

Related U.S. Application Data

(63) Continuation of application No. 12/699,789, filed on Feb. 3, 2010, now Pat. No. 8,452,611, which is a continuation of application No. 11/218,069, filed on Sep. 1, 2005, now Pat. No. 7,904,306.

(60) Provisional application No. 60/606,306, filed on Sep. 1, 2004.

(51) Int. Cl.
*G06F 19/00* (2011.01)
*G06Q 40/02* (2012.01)
*G06Q 50/22* (2012.01)

(52) U.S. Cl.
CPC .............. *G06Q 40/025* (2013.01); *G06Q 50/22* (2013.01)
USPC .......................................................... 705/2

(58) Field of Classification Search
CPC ....... G06Q 50/22; G06Q 50/24; G06Q 40/08; G06Q 10/10; G06F 19/328

USPC .......................................................... 705/2–3
See application file for complete search history.

(56) References Cited

U.S. PATENT DOCUMENTS

| | | |
|---|---|---|
| 3,316,395 A | 4/1967 | Lavin et al. |
| 4,346,442 A | 8/1982 | Musmanno |

(Continued)

FOREIGN PATENT DOCUMENTS

| | | |
|---|---|---|
| WO | WO 94/12943 | 6/1994 |
| WO | WO 95/12857 | 5/1995 |

(Continued)

OTHER PUBLICATIONS

"ACS Company Birch & Davis Wins Texas CHIP Contract," PR Newswire, Section: Financial News, 3 pgs., Dallas, TX, May 17, 2000.

(Continued)

*Primary Examiner* — Michelle L Le
(74) *Attorney, Agent, or Firm* — Knobbe, Martens, Olson & Bear LLP

(57) ABSTRACT

According to one example embodiment, there is provided a method and an apparatus to evaluate the credit of a healthcare patient. The example embodiment provides methods and computer systems programmed to use multiple variables that are known about a patient prior to a service being rendered to segment the patient population into finer grained groupings. These finer grained groupings allow financial factors, such as a credit score, to be a more accurate predictor. Also, according to another example embodiment, the model is not a generic model for all patients, but the variables and their parameters are specific to a particular healthcare organization's or facility's patient population. This creates a custom model that further enhances its predictiveness.

20 Claims, 3 Drawing Sheets

(56) References Cited

U.S. PATENT DOCUMENTS

| | | | |
|---|---|---|---|
| 4,491,725 A | 1/1985 | Pritchard |
| 4,812,628 A | 3/1989 | Boston et al. |
| 4,872,113 A | 10/1989 | Dinerstein |
| 4,947,028 A | 8/1990 | Gorog |
| 5,239,462 A | 8/1993 | Jones et al. |
| 5,301,105 A | 4/1994 | Cummings, Jr. |
| 5,500,513 A | 3/1996 | Langhans et al. |
| 5,557,514 A | 9/1996 | Seare et al. |
| 5,583,760 A | 12/1996 | Klesse |
| 5,611,052 A | 3/1997 | Dykstra et al. |
| 5,644,778 A | 7/1997 | Burks et al. |
| 5,699,527 A | 12/1997 | Davidson |
| 5,704,044 A | 12/1997 | Tarter et al. |
| 5,764,923 A | 6/1998 | Tallman et al. |
| 5,832,447 A | 11/1998 | Rieker et al. |
| 5,870,721 A | 2/1999 | Norris |
| 5,878,403 A | 3/1999 | DeFrancesco et al. |
| 5,884,287 A | 3/1999 | Edesess |
| 5,903,830 A | 5/1999 | Joao et al. |
| 5,903,881 A | 5/1999 | Schrader et al. |
| 5,907,828 A | 5/1999 | Meyer et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 5,966,699 A | 10/1999 | Zandi |
| 5,970,478 A | 10/1999 | Walker et al. |
| 5,995,947 A | 11/1999 | Fraser et al. |
| 5,999,596 A | 12/1999 | Walker et al. |
| 6,014,632 A | 1/2000 | Gamble et al. |
| 6,018,723 A | 1/2000 | Siegel et al. |
| 6,021,943 A | 2/2000 | Chastain |
| 6,029,149 A | 2/2000 | Dykstra et al. |
| 6,044,351 A | 3/2000 | Jones |
| 6,044,352 A | 3/2000 | Deavers |
| 6,067,522 A | 5/2000 | Warady et al. |
| 6,073,104 A | 6/2000 | Field |
| 6,088,686 A | 7/2000 | Walker et al. |
| 6,098,052 A | 8/2000 | Kosiba et al. |
| 6,108,641 A | 8/2000 | Kenna et al. |
| 6,128,602 A | 10/2000 | Northington et al. |
| 6,129,273 A | 10/2000 | Shah |
| 6,144,948 A | 11/2000 | Walker et al. |
| 6,163,770 A | 12/2000 | Gamble et al. |
| 6,171,112 B1 | 1/2001 | Clark et al. |
| 6,185,543 B1 | 2/2001 | Galperin et al. |
| 6,202,053 B1 | 3/2001 | Christiansen et al. |
| 6,208,973 B1 | 3/2001 | Boyer et al. |
| 6,233,566 B1 | 5/2001 | Levine et al. |
| 6,311,169 B2 | 10/2001 | Duhon |
| 6,327,578 B1 | 12/2001 | Linehan |
| 6,341,265 B1 | 1/2002 | Provost et al. |
| 6,343,271 B1 | 1/2002 | Peterson et al. |
| 6,374,229 B1 | 4/2002 | Lowrey et al. |
| 6,374,230 B1 | 4/2002 | Walker et al. |
| 6,385,594 B1 | 5/2002 | Lebda et al. |
| 6,405,181 B2 | 6/2002 | Lent et al. |
| 6,422,462 B1 | 7/2002 | Cohen |
| 6,453,297 B1 | 9/2002 | Burks et al. |
| 6,456,979 B1 | 9/2002 | Flagg |
| 6,456,983 B1 | 9/2002 | Keyes et al. |
| 6,513,018 B1 | 1/2003 | Culhane |
| 6,587,841 B1 | 7/2003 | DeFrancesco |
| 6,598,030 B1 | 7/2003 | Siegel et al. |
| 6,611,816 B2 | 8/2003 | Lebda et al. |
| 6,684,093 B2 | 1/2004 | Kuth |
| 6,826,535 B2 | 11/2004 | Wood et al. |
| 6,847,942 B1 | 1/2005 | Land et al. |
| 6,901,406 B2 | 5/2005 | Nabe et al. |
| 7,003,491 B2 | 2/2006 | Starkman |
| 7,016,856 B1 | 3/2006 | Wiggins |
| 7,072,842 B2 | 7/2006 | Provost et al. |
| 7,133,840 B1 | 11/2006 | Kenna et al. |
| 7,171,371 B2 | 1/2007 | Goldstein |
| 7,174,302 B2 | 2/2007 | Patricelli et al. |
| 7,181,427 B1 | 2/2007 | DeFrancesco |
| 7,191,150 B1 | 3/2007 | Shao et al. |
| 7,191,451 B2 | 3/2007 | Nakagawa |
| 7,197,468 B1 | 3/2007 | Patricelli et al. |
| 7,246,068 B2 | 7/2007 | Thomas, Jr. |
| 7,249,076 B1 | 7/2007 | Pendleton et al. |
| 7,295,988 B1 | 11/2007 | Reeves |
| 7,298,872 B2 | 11/2007 | Glisson |
| 7,305,359 B2 | 12/2007 | Bonnell |
| 7,310,617 B1 | 12/2007 | Cunningham |
| 7,328,276 B2 | 2/2008 | Alisuag |
| 7,333,937 B2 | 2/2008 | Baldwin, Jr. et al. |
| 7,346,576 B2 | 3/2008 | Lent et al. |
| 7,379,913 B2 | 5/2008 | Steele et al. |
| 7,380,707 B1 | 6/2008 | Fredman |
| 7,383,215 B1 | 6/2008 | Navarro et al. |
| 7,451,095 B1 | 11/2008 | Bradley et al. |
| 7,505,939 B2 | 3/2009 | Lent et al. |
| 7,527,967 B2 | 5/2009 | Chao et al. |
| 7,556,192 B2 | 7/2009 | Wokaty, Jr. |
| 7,630,933 B2 | 12/2009 | Peterson et al. |
| 7,689,506 B2 * | 3/2010 | Fei et al. ............ 705/39 |
| 7,698,153 B2 | 4/2010 | Wiggins |
| 7,711,636 B2 | 5/2010 | Robida et al. |
| 7,747,559 B2 | 6/2010 | Leitner et al. |
| 7,761,379 B2 | 7/2010 | Zoldi et al. |
| 7,765,148 B2 | 7/2010 | German et al. |
| 7,797,172 B2 | 9/2010 | Fitzgerald et al. |
| 7,814,004 B2 | 10/2010 | Haggerty et al. |
| 7,840,484 B2 | 11/2010 | Haggerty et al. |
| 7,860,786 B2 | 12/2010 | Blackburn et al. |
| 7,873,528 B2 | 1/2011 | Bregante et al. |
| 7,885,836 B2 | 2/2011 | Pendleton et al. |
| 7,904,306 B2 | 3/2011 | Johnson et al. |
| 7,941,363 B2 | 5/2011 | Tanaka et al. |
| 7,970,679 B2 | 6/2011 | Kasower |
| 7,983,932 B2 | 7/2011 | Kane |
| 7,991,689 B1 | 8/2011 | Brunzell et al. |
| 8,001,042 B1 | 8/2011 | Brunzell et al. |
| 8,036,979 B1 | 10/2011 | Torrez et al. |
| 8,060,424 B2 | 11/2011 | Kasower |
| 8,078,524 B2 | 12/2011 | Crawford et al. |
| 8,185,408 B2 | 5/2012 | Baldwin, Jr. et al. |
| 8,195,549 B2 | 6/2012 | Kasower |
| 8,234,498 B2 | 7/2012 | Britti et al. |
| 8,315,943 B2 | 11/2012 | Torrez et al. |
| 8,364,588 B2 | 1/2013 | Celka et al. |
| 8,452,611 B1 | 5/2013 | Johnson et al. |
| 2001/0014868 A1 | 8/2001 | Herz et al. |
| 2001/0029482 A1 | 10/2001 | Tealdi et al. |
| 2001/0034618 A1 | 10/2001 | Kessler et al. |
| 2001/0037289 A1 | 11/2001 | Mayr et al. |
| 2001/0039523 A1 | 11/2001 | Iwamoto |
| 2002/0010594 A1 | 1/2002 | Levine |
| 2002/0077869 A1 | 6/2002 | Doyle et al. |
| 2002/0077964 A1 | 6/2002 | Brody et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0103680 A1 | 8/2002 | Newman |
| 2002/0107849 A1 | 8/2002 | Hickey et al. |
| 2002/0120776 A1 | 8/2002 | Eggebraaten et al. |
| 2002/0133503 A1 | 9/2002 | Amar et al. |
| 2002/0138417 A1 | 9/2002 | Lawrence |
| 2002/0147617 A1 | 10/2002 | Schoenbaum et al. |
| 2002/0147669 A1 | 10/2002 | Taylor et al. |
| 2002/0184054 A1 | 12/2002 | Cox et al. |
| 2002/0188478 A1 | 12/2002 | Breeland et al. |
| 2003/0018549 A1 | 1/2003 | Fei et al. |
| 2003/0028402 A1 | 2/2003 | Ulrich et al. |
| 2003/0036926 A1 | 2/2003 | Starkey et al. |
| 2003/0037054 A1 | 2/2003 | Dutta et al. |
| 2003/0041019 A1 * | 2/2003 | Vagim et al. ............ 705/38 |
| 2003/0046112 A1 | 3/2003 | Dutta et al. |
| 2003/0050795 A1 * | 3/2003 | Baldwin et al. ............ 705/2 |
| 2003/0050796 A1 | 3/2003 | Baldwin, Jr. et al. |
| 2003/0078877 A1 | 4/2003 | Beirne et al. |
| 2003/0163416 A1 | 8/2003 | Kitajima |

(56) References Cited

U.S. PATENT DOCUMENTS

| | | |
|---|---|---|
| 2003/0208412 A1 | 11/2003 | Hillestad et al. |
| 2003/0219709 A1 | 11/2003 | Olenick et al. |
| 2003/0229507 A1 | 12/2003 | Perge |
| 2003/0233259 A1 | 12/2003 | Mistretta et al. |
| 2003/0233278 A1 | 12/2003 | Marshall |
| 2003/0236747 A1 | 12/2003 | Sager |
| 2004/0006489 A1 | 1/2004 | Bynon |
| 2004/0030649 A1 | 2/2004 | Nelson et al. |
| 2004/0049473 A1 | 3/2004 | Gower et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078228 A1 | 4/2004 | Fitzgerald et al. |
| 2004/0111292 A1 | 6/2004 | Hutchins |
| 2004/0117211 A1 | 6/2004 | Bonnell |
| 2004/0148203 A1 | 7/2004 | Whitaker et al. |
| 2004/0172313 A1 | 9/2004 | Stein et al. |
| 2004/0177030 A1 | 9/2004 | Shoham |
| 2004/0204948 A1 | 10/2004 | Singletary et al. |
| 2004/0215556 A1 | 10/2004 | Merkley, Jr. et al. |
| 2004/0230534 A1 | 11/2004 | McGough |
| 2004/0267660 A1 | 12/2004 | Greenwood et al. |
| 2005/0015280 A1 | 1/2005 | Gabel et al. |
| 2005/0038670 A1 | 2/2005 | Takkar et al. |
| 2005/0049991 A1 | 3/2005 | Aggarwal |
| 2005/0065874 A1 | 3/2005 | Lefner et al. |
| 2005/0086071 A1 | 4/2005 | Fox, Jr. et al. |
| 2005/0086072 A1 | 4/2005 | Fox, Jr. et al. |
| 2005/0091080 A1 | 4/2005 | Biats, Jr. |
| 2005/0137912 A1 | 6/2005 | Rao et al. |
| 2005/0187948 A1 | 8/2005 | Monitzer et al. |
| 2005/0197954 A1 | 9/2005 | Maitland et al. |
| 2005/0209880 A1 | 9/2005 | Drelicharz et al. |
| 2005/0209922 A1 | 9/2005 | Hofmeister |
| 2005/0228748 A1 | 10/2005 | Togher et al. |
| 2005/0288964 A1 | 12/2005 | Lutzen et al. |
| 2006/0031158 A1 | 2/2006 | Orman |
| 2006/0074991 A1 | 4/2006 | Lussier et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0100954 A1 | 5/2006 | Schoen |
| 2006/0155639 A1 | 7/2006 | Lynch et al. |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0212315 A1 | 9/2006 | Wiggins |
| 2006/0235743 A1 | 10/2006 | Long et al. |
| 2006/0247947 A1 | 11/2006 | Suringa |
| 2006/0282359 A1 | 12/2006 | Nobili et al. |
| 2006/0293923 A1 | 12/2006 | Farris |
| 2007/0005402 A1 | 1/2007 | Kennedy et al. |
| 2007/0005403 A1 | 1/2007 | Kennedy et al. |
| 2007/0027778 A1 | 2/2007 | Schellhammer et al. |
| 2007/0118410 A1 | 5/2007 | Nadai |
| 2007/0124235 A1 | 5/2007 | Chakraborty et al. |
| 2007/0130070 A1 | 6/2007 | Williams |
| 2007/0174122 A1 | 7/2007 | Howard et al. |
| 2007/0198336 A1 | 8/2007 | Thompson |
| 2007/0198407 A1 | 8/2007 | Winter |
| 2007/0214005 A1 | 9/2007 | Kennedy |
| 2007/0255646 A1 | 11/2007 | Morris et al. |
| 2007/0258626 A1 | 11/2007 | Reiner |
| 2007/0279187 A1 | 12/2007 | Hekmatpour et al. |
| 2007/0294126 A1 | 12/2007 | Maggio |
| 2007/0299699 A1 | 12/2007 | Policelli et al. |
| 2008/0010096 A1 | 1/2008 | Patterson et al. |
| 2008/0015979 A1 | 1/2008 | Bentley |
| 2008/0059224 A1 | 3/2008 | Schechter |
| 2008/0059317 A1 | 3/2008 | Chandran et al. |
| 2008/0065569 A1 | 3/2008 | Dutt et al. |
| 2008/0086400 A1 | 4/2008 | Ardelean et al. |
| 2008/0109315 A1 | 5/2008 | Huang et al. |
| 2008/0120133 A1 | 5/2008 | Krishnaswami et al. |
| 2008/0133325 A1 | 6/2008 | De et al. |
| 2008/0183504 A1 | 7/2008 | Highley |
| 2008/0189202 A1 | 8/2008 | Zadoorian et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294540 A1 | 11/2008 | Celka et al. |
| 2009/0044279 A1 | 2/2009 | Crawford et al. |
| 2009/0048877 A1 | 2/2009 | Binns et al. |
| 2009/0094055 A1 | 4/2009 | Gage, Jr. et al. |
| 2009/0099960 A1 | 4/2009 | Robida et al. |
| 2009/0138277 A1 | 5/2009 | Warren et al. |
| 2009/0157435 A1 | 6/2009 | Seib |
| 2009/0177480 A1 | 7/2009 | Chen et al. |
| 2009/0222308 A1 | 9/2009 | Zoldi et al. |
| 2009/0276244 A1 | 11/2009 | Baldwin, Jr. et al. |
| 2009/0281827 A1 | 11/2009 | Pendleton et al. |
| 2010/0063907 A1 | 3/2010 | Savani et al. |
| 2010/0142698 A1 | 6/2010 | Spottiswoode et al. |
| 2011/0010189 A1 | 1/2011 | Dean et al. |
| 2011/0112873 A1 | 5/2011 | Allen et al. |
| 2012/0066084 A1 | 3/2012 | Sneyders |
| 2012/0158574 A1 | 6/2012 | Brunzell et al. |
| 2012/0215682 A1 | 8/2012 | Lent et al. |
| 2013/0006825 A1 | 1/2013 | Robida et al. |
| 2013/0080315 A1 | 3/2013 | Torrez et al. |
| 2013/0173450 A1 | 7/2013 | Celka et al. |

FOREIGN PATENT DOCUMENTS

| | | |
|---|---|---|
| WO | WO 99/46710 | 9/1999 |
| WO | WO 01/04821 | 1/2001 |
| WO | WO 01/41355 | 6/2001 |
| WO | WO 02/13047 | 2/2002 |
| WO | WO 2004/114160 | 12/2004 |
| WO | WO 2008/021061 | 2/2008 |
| WO | WO 2008/147918 | 12/2008 |

OTHER PUBLICATIONS

"An Even Better Solution to Financing Elective Surgery . . . ", Unicorn Financial, pp. 7, http://web.archive.org/web/20000816161359/http://www.unicornfinancial.com/, as downloaded Oct. 15, 2008.

"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.

An Expert System for Determining Medicaid Eligibility, Journal of Medical Systems, vol. 12, Nov. 5, 1988, in 10 pages.

Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].

Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.

"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].

Boss, Shira J. "Elective Surgery Without the Plastic: Low-Interest Medical Financing Provides Alternative to Credit Cards," factiva, Crain's New York Business, 2 pgs., dated Jun. 22, 1998.

Broward County CAP Grant Application, as printed on Aug. 10, 2009, 41 pgs.

Burr Ph.D., et al., "Utility Payments as Alternative Credit Data: A Reality Check", Asset Builders of America, Inc., Oct. 5, 2006, pp. 1-18, Washington, D.C.

Butkus, Charles, "System Cuts Medicaid Processing to 11 Cents a Claim", ComputerWorld, May 21, 1975, pp. 51 and 53.

Calnan, Christopher, "Tenet, Fair Isaac invest $20M in startup," MHT, Mass High Tech: The Journal of New England Technology, dated Jul. 23, 2007, 2 pgs.

(56) References Cited

OTHER PUBLICATIONS

Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing; Use the Latest CRM Tools and Techniques, www.CardForum.com, vol. 5 No. 10, Dec. 2001.
"Charity Care Policy and Procedure", Report to the Community for the Year 2002, John T. Mather Memorial Hospital, Port Jefferson, NY, 2002.
Cheney, Karen, "Fix Your Nose, If You Wish, But Not With This New Loan," Money Magazine, vol. 27, No. 5, 1 pg., dated May 1, 1998.
Compliance Data Systems, Inc. T-PASS Catalogue Profile, Sep. 8, 1994, available at http://www.compliancedata.com/catalogue.html.
"Current System Architecture and Functional Specifications", TDHS System, Jul. 3, 2000.
DentalFinancing.com, "Financial services for patients and dental professionals,", 7 pgs., as downloaded from http://web.archive.org/web/20010607151954/www.dentalfinancing.com/dentist/index.asp (1 of 2) ]Oct. 15, 2008 3:55:16 PM].
Dietz, Ellen, "Dental Office Management," 8 pgs., pp. 316-321, Copyright 2000.
eFunds Introduces QualiFileSM, Deluxe Corporation, Sep. 1999, Milwaukee, WI.
Electronic Privacy Information Center, "The Fair Credit Reporting Act" 15 USC 1681 (1992), 10 pgs., as downloaded from http://epic.org/privacy/financial/fcra.html on Mar. 19, 2008.
Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
"Enterprise Technology Management Architecture", Texas Department of Human Services, Version 1.0, Aug. 31, 1999, pp. 22.
Experian, Custom Strategist and Qualifile from Funds, 2000, in 2 pages.
"Factual Data Corp. Completes First Interface with Automated Underwriting System for Subprime Lenders", PR Newswire, Loveland, CO, Jan. 17, 2000.
Felsenthal, Edward, "Health Costs; Managed Care Helps Curb Costs, Study Says," The Wall Street Journal, dated Aug. 12, 1991.
"Financing Medical Procedures A Lucrative But Risky Business," Credit Risk Management Report, vol. 10, Issue 15, 2 pgs., dated Aug. 7, 2000.
Frohlich, Robert M., Jr., "Credit Scoring in a Hospital Setting", University of North Florida Thesis, Paper 97, Apr. 1997, pp. 82.
Gilje, Shelby, "Credit Agency Moving Into Health Care," NewsRoom, The Seattle Times, Section: Scene, Mar. 22, 1995, pp. 3, http://web2.westlaw.com/result/documenttext.aspx?rs=WLW8.03&ss+CNT&rp=%2fWelc . . . .
Goldstein, Jacob, "The Newest Vital Sign: Your Credit Score," The Wall Street Journal, Health Blog, as viewed at http://blogs.wsj.com/health/2008/03/18/the-newest-vital-sign-your-cr . . . , 3 pgs.
"HelpWorks Family of Products Offers Solutions for Providers of Social Services", Software Announcement, Letter No. 297-476, Nov. 11, 1997, http://www.www-304.ibm.com/jct01003c/cgi-bin/common/ssi/ssialias?infotype=an&subtype=ca&htmlfid=897/ENUS297-476&appname=xldata&language=enus.
"HelpWorks: One-Stop Screening for the Benefits Your Clients Need", Peter Martin Associates, Inc. website, HelpWorks description, Jul. 11, 2000, http://web.archive.org/web/20000711013829/http://www.petermartin.com/Products/HelpWorks/hw_info02.html.
Henry, M.D., Kimberly A., "The Face-Lift Sourcebook," copyright 2000, 3 pgs. (p. 207).
"Implementation Advance Planning Document", Implementation Advance Planning Document, TIERS, Texas Department of Human Services, Eric M. Bost, Commissioner, May 2000, pp. 128.

"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Section on Adolescent Health, Sep. 26-27, 1999, 9 pages.
Income and Eligibility Verification System (IEVS), Medi-Cal Eligibility Procedures Manual, Apr. 2000, pp. 164.
IndiCareTM, On-Line Patient Assistant Program, Website Users Manual, JBI Associates, LLC, 1997.
Jones, Sandra, "Small Software Firm Aiming for Internet", ChicagoBusiness.com, Mar. 13, 2000.
Kent, Heather, "Huge declines in price as competition heats up in Vancouver's booming laser-surgery market," CMAJ, Oct. 5, 1999; 161 (7), pp. 857-858.
Lavelle, Marianne, "Health Plan Debate Turning to Privacy Some Call for Safeguards on Medical Disclosure. Is a Federal Law Necessary?" The National Law Journal, vol. 16, No. 39, dated May 30, 1994, as downloaded from http://web2.westlaw.com/result/.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.
"MediCredit Announces Major Investment from Medstone; Financing Will Enable Dramatic Expansion of Online Services," Business Wire, pp. 2, dated May 12, 2000.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
Mowll, Charles, "Setting a Credit Policy for Patient Accounts", Healthcare Financial Management, Jan. 1989, pp. 3.
Mowll, Charles, "Knowing How and When to Grant Credit Healthcare Organizations", Healthcare Financial Management, Feb. 1989, pp. 4.
Network Sciences Website, Community Health and Social Services Information System (CHASSIS) and Medicaider software by Network Sciences, LLC, on sale and/or in public use in or around 2000, http://www.netsci.net/index.asp.
*Newsom v. Vanderbilt University et al.*, Opinion, 453 F.Supp. 401 (1978), Jun. 1, 1978, pp. 24.
NewsRoom, Insurance Regulator, State Survey, "CIGNA Report Withdrawn As Foe Sees Opening," Sep. 9, 1996, vol. 8, Issue 34, 4pgs, as downloaded at http://web2.westlaw.com/result/documenttext.aspx?rs=WLW8.03&ss=CNT&rp=%2fWelc . . . on Mar. 19, 2008.
"Patients May be Frauds", The Victoria Advocate, Victoria, Texas, 138th Year—No. 194, p. 10A, Nov. 17, 1983.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.
"Peter Martin Releases HelpWorks Web Edition", Business Wire, Chicago, Sep. 28, 1999.
"Response Automated Decision Systems", responsecorp.com, Inc., Press Release, Ft. Lauderdale, FL, Jun. 22, 2000, http://web.archive.org/web/20010420061717/http://www.responsecorp.com/news.html.
Rubin, Rita, "Cosmetic Surgery on Credit, Finance plans let patients reconstruct now, pay later," The Dallas Morning News, 2 pgs., dated Sep. 10, 1988.
Sear, Alan M., Ph.D., "An Expert System for Determining Medicaid Eligibility", Journal of Medical Systems, Oct. 1988, vol. 12, Issue 5, pp. 275-283.
SearchAmerica, Solutions, "Payment Advisor Suite TM" 2008.
Selz, Michael, "Lenders Find Niche In Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs.

(56) References Cited

OTHER PUBLICATIONS

"StarNet Financial, Inc. Acquires Proprietary Rights to Sub-Prime Underwriting System Through Strategic Alliance With TRAkkER Corporation", PR Newswire, Dallas, TX, Sep. 13, 1999.
State of Wisconsin, Division of Health Care Financing, Department of Health and Family Services: 1999-2001 Biennial Report, pp. 17-21.
Stein, Benchmarking Default Prediction Models: Pitfalls and Remedies in Model Validation, Moody's KMV, Revised Jun. 13, 2002, Technical Report #020305; New York.
Technical Architecture Framework, TIERS, May 8, 2000, pp. 67.
Texas Comptroller of Public Accounts, Texas Performance Review, "Against the Grain: vol. 2," 1993, as printed Dec. 14, 2012 in 7 pages, from http://www.window.texas.gov/tpr/atg/atg/atgtoc.html.
Texas Comptroller of Public Accounts, Texas Performance Review, "Gaining Ground: vol. 2," 1994, as printed Dec. 14, 2012 in 4 pages, from http://www.window.texas.gov/tpr/tprgg/v2home.html.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
"Third Party Assistance Software System (T-PASS)", Compliance Data Systems, Inc. website, T-PASS Information Page, Oct. 1, 1998, available at http://web.archive.org/web/20010308232545/http://compliancedata.com/tpass.html#Profile.
Thomas, David, "Report on Networks and Electronic Communications Newcourt Credit turns to extranet Services / A PC connects to 1,200 users at once." The Globe and Mail (Canada), Section: Report on Business Special Report, 2 pgs., dated Nov. 12, 1996.
TRAkkER Corporation website, trakkercorp.com, TRAkkER Software Description, May 26, 2000, available at http://web.archive.org/web/20000526234204/http://trakkercorp.com/page4.html.
*TransUnion Intelligence LLC v. Search America, Inc.*, Videotape Deposition of Jodi Halpine, Oct. 16, 2012, Case No. 0:11-CV-01075-EJS-FLN, pp. 176.
*TransUnion Intelligence LLC v. Search America, Inc.*, Jury Trial Demand, Non-Confidential Redacted Version, Case No. 0:11-CV-01075-EJS-FLN, pp. 42.
*United States of America v. Patricia Lahaie Mahaney*, Government's Response to the Standing Discovery Order, Case:0:03-cr-60022-JIC, Entered into docket Jun. 17, 2003, pp. 16.
Washington Automated Client Eligibility System (ACES), 1996, pp. 13.
Washington State Office of Public Defense, "Criteria and Standards for Determining and Verifying Indigency," dated Feb. 9, 2001.
Webpage printed from http://www.magnum.net/pdfs/RapUpBrochure.pdf as printed Mar. 3, 2008.
"Web Site Fuels Elective Surgery Trend; The Complete Resource to Paying for Cosmetic Surgery, Laser Vision Correction and Cosmetic Dentistry," Business Wire, 2 pgs, dated Apr. 7, 1999.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.
Wisconsin Department of Workforce Development, BadgerCare Medicaid Notification of Eligibility, dated Jul. 25, 2000, effective date, Jul. 1, 2000.
Zoot—Decision Engine, www.zootweb.com/decision_engine.html as printed on Mar. 3, 2008.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
Texas Department of Human Services, Revision Notice, Revision 99-1, Effective: Jan. 1, 1999, dated Dec. 11, 1998, pp. 11.
Texas Department of Human Services, Revision Notice, Revision 99-3, Effective: Jul. 1, 1999, dated May 28, 1999, pp. 11.
Texas Department of Human Services, Revision Notice, Revision 99-6, Effective: Oct. 1, 1999, dated Sep. 3, 1999, pp. 20.
Texas Department of Human Services, Revision Notice, Revision 00-3, Effective: Apr. 1, 2000, dated Mar. 3, 2000, pp. 17.
Texas Department of Human Services, OIG, 3000—Case Development, Jan. 1999, pp. 3.
Texas Department of Human Services, System Specifications, Section 3.2, Current System Architecture and Functional Specifications, NOA Assembled, pp. 21, as last modified Jul. 4, 2000.
Texas Department of Human Services, System Specifications, Section 3.3, Current System Architecture and Functional Specifications, GWS Assembled, pp. 752, as last modified Jul. 4, 2000.
Texas Department of Human Services, System Specifications, Section 3.3.1, TESS System, pp. 47, as last modified Jul. 4, 2000.
Texas Department of Human Services, System Specifications, Section 3.4, Current System Architecture and Functional Specifications, LTCMED Assembled, pp. 372, as last modified Jul. 4, 2000.
Texas Department of Human Services, System Specifications, Section 3.5, Current System Architecture and Functional Specifications, SAVERR FS Assembled, pp. 141, as last modified Jul. 4, 2000.
Texas Department of Human Services, System Specifications, Section 3.6, SAVERR TANF Assembled, pp. 219, as last modified Jul. 4, 2000.
Texas Department of Human Services, System Specifications, Section 3.7, Current System Architecture and Functional Specifications, SAVERR FS, Assembled, pp. 141, as last modified Jul. 5, 2000.
Texas Department of Human Services, System Specifications, Section 3.8, Current System Architecture and Functional Specifications, SAVERR INTER, pp. 838, as last modified Jul. 4, 2000.
*Search America, Inc. v. TransUnion Intelligence LLC*, Decision, Case No. CBM2013-00038, Patent No. 7,333,937, Feb. 7, 2014, pp. 24.
*Search America, Inc. v. TransUnion Intelligence LLC*, Decision, Case No. CBM2013-00038, Patent No. 8,185,408, Feb. 7, 2014, pp. 22.
Agreement Between Dallas Computer Services, dba DCS Information Systems and the Texas Department of Human Services, to Provide Data Brokering Services, Contract #324Z-8-05203 signed Jun. 15, 1998 and including corresponding documents in 38 pages. [Search America—Exhibit 1010].
Curriculum Vitae of Kenneth A. Zeger dated Jan. 8, 2013 in 20 pages.
"Parse", Definition from PC Magazine Encyclopedia, http://www/pcmag.com/encyclopedia_term_0,2542,t=parse&i=48862,00.asp as downloaded Mar. 5, 2012.
PC411, Inc. "Reverse Searching Now Available on PC411," http://web.archive.org/web/19961103061843/http://www.pc411.com/PR_Revrs.html Apr. 9, 1996 in 2 pages.
*Search America, Inc. v. TransUnion Intelligence LLC*, Declaration of Kenneth Zeger in re: Patent No. 7,333,937, Signed Jul. 24, 2013, pp. 9.
*Search America, Inc. v. TransUnion Intelligence LLC*, Declaration of Kenneth Zeger in re: Patent No. 8,185,408, Signed Jul. 29, 2013, pp. 9.
*Search America, Inc. v. TransUnion Intelligence LLC*, Patent Owner Transunion Intelligence, LLC's Preliminary Response, Case No. CBM2013-00037, Patent No. 7,333,937, Nov. 11, 2013, pp. 28.
*Search America, Inc. v. TransUnion Intelligence LLC*, Patent Owner Transunion Intelligence, LLC's Preliminary Response, Case No. CBM2013-00038, Patent No. 8,185,408, Nov. 11, 2013, pp. 26.
*Search America, Inc. v. TransUnion Intelligence LLC*, Petition for Covered Business Method Patent Review Under 35 U.S.C. §§ 321 and Section 18 of the Leahy-Smith America Invents Act, Patent No. 8,185,408, Jul. 29, 2013, pp. 84.
*Search America, Inc. v. TransUnion Intelligence LLC*, Petition for Covered Business Method Patent Review Under 35 U.S.C. §§ 321 and Section 18 of the Leahy-Smith America Invents Act, Case No. Patent No. 7,333,937, Jul. 29, 2013, pp. 88.

(56) References Cited

OTHER PUBLICATIONS

Texas Department of Human Services, System Specifications, Section 3.3, Current System Architecture and Functional Specifications, GWS Assembled, pp. 754, as last modified Jul. 4, 2000.

Texas Department of Human Services, System Specifications, Section 3.8, Current System Architecture and Functional Specifications, pp. 172.

"TIERS Procurement Information," Texas Department of Human Services, as captured May 26, 2000 http://web.archive.org/web/20000526131749/http://www.dhs.state.tx.us/programs/TIERS/procurement.html in 3 pages.

*TransUnion Intelligence LLC* v. *Search America, Inc.*, Videotape Deposition of James Sunyar, Nov. 12, 2012, Case No. 0:11-CV-01075-EJS-FLN, pp. 128.

*TransUnion Intelligence LLC* v. *Search America, Inc.*, Oral and Videotape Deposition of Bobby Keith Graves, Oct. 26, 2012, Case No. 0:11-CV-01075-PJS-FLN, pp. 181.

*TransUnion Intelligence LLC* v. *Search America, Inc.*, Oral and Videotape Deposition of Kerby Spruiell, May 13, 2013, Case No. 0:11-CV-01075, pp. 257.

*TransUnion Intelligence LLC* v. *Search America, Inc.*, Jury Trial Demand, Case No. 0:11-cv-01075-PJS-FLN, pp. 18.

\* cited by examiner

METHOD AND APPARATUS FOR ASSESSING CREDIT FOR HEALTHCARE PATIENTS

CROSS-REFERENCE TO RELATED APPLICATIONS

This application is a continuation of U.S. patent application Ser. No. 12/699,789, filed on Feb. 3, 2010, which is a continuation of U.S. patent application Ser. No. 11/218,069, filed on Sep. 1, 2005, now U.S. Pat. No. 7,904,306, which claims priority to U.S. Provisional Application No. 60/606,306 filed on Sep. 1, 2004. The entire contents of each of the above reference applications are hereby expressly incorporated herein by reference in their entireties.

FIELD

The present subject matter relates to healthcare patient credit, and more particularly to methods and apparatuses to assess credit of healthcare patients.

BACKGROUND

Healthcare entities would like to know which patients are likely to pay their bills (patient financial responsibility) and which are not likely to pay. Those deemed not able to pay will receive the same treatment as other patients, but the earlier their need is identified the sooner that the healthcare facility can get the patient into financial counseling or enrolled in an appropriate Medicaid, charity care or grant program. Also, if a patient is not likely to pay and they are not eligible for charity programs, then a healthcare facility can choose to expend fewer resources trying to collect and therefore save money.

There have been attempts to predict a patient's ability to pay using conventional "generic" credit scores, but these have met limited success. This is because each healthcare facility's patient population differs from others and a generic credit score model is insufficient to accurately predict the outcomes. A generic credit score is often too general a predictor since it treats all patient segments the same.

DETAILED DESCRIPTION

Figure 1:
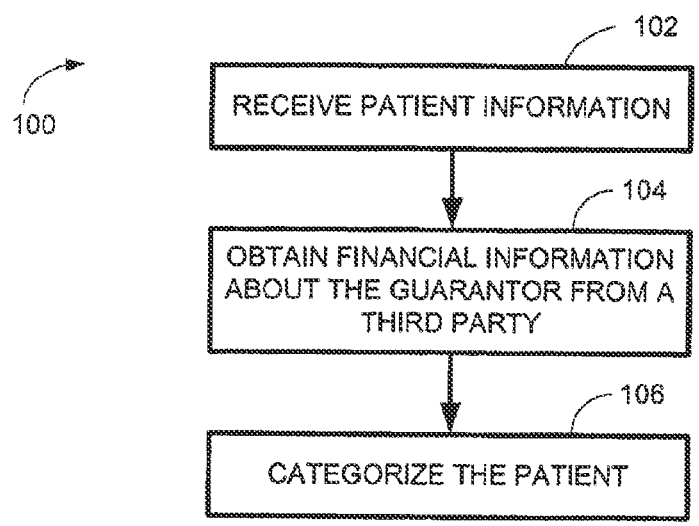
FIG. 1 illustrates a method according to an example embodiment.

In the following detailed description, reference is made to the accompanying drawings that form a part hereof, and in which is shown by way of illustration specific embodiments in which the subject matter can be practiced. These embodiments are described in sufficient detail to enable those skilled in the art to practice them, and it is to be understood that other embodiments can be utilized and that structural, logical, and electrical changes can be made without departing from the scope of the inventive subject matter. Such embodiments of the inventive subject matter can be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable media such as memory or other type of storage devices. The term "computer readable media" is also used to represent electromagnetic carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, an application specific integrated circuit ("ASIC"), a microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an ASIC. Thus, the exemplary process flow is applicable to software, firmware, and hardware implementations.

According to one example embodiment, there is provided a method and an apparatus to evaluate the credit of a healthcare patient. The example embodiment provides methods and computer systems programmed to use multiple variables that are known about a patient prior to a service being rendered to segment the patient population into finer grained groupings. These finer grained groupings allow financial factors, such as a credit score, to be a more accurate predictor of payment. Also, according to another example embodiment, the model is not a generic model for all patients, but the variables and their parameters are specific to a particular healthcare organization's or facility's patient population. This creates a custom model that further enhances its predictiveness.

In the example embodiment, illustrated in FIG. 1, the method 100 or programmed computing system receives information about a patient 102. The attributes can include anything that is known about the patient prior to a service being rendered. This could include patient type (i.e. inpatient, outpatient, emergency room, etc) and patient financial class (i.e. Medicare, Medicaid, commercial payer, self pay, etc), age, amount owed, marital status, etc. These variables are used to segment the patient population. These variables are also used to determine whether additional financial information from a credit bureau would increase the accuracy of the prediction of payment. Since there is a cost associated with obtaining the additional information, the benefit of the increase in predictiveness is weighed against the increased cost, and a decision is made whether to obtain the additional information.

If additional benefit is deemed positive, the financial information about the guarantor or patient is then obtained from a third party 104 or a credit bureau or similar source, for example by downloading it into the computing system determining the credit rating for the patient over a network. Such a network can include a proprietary network, a world wide network such as the Internet, or other network over which such information can be obtained. The quality and effectiveness of a data source (credit bureau) varies by geographic region. Which data source to use is determined by an algorithm called the "Bureau Selector" (see Bureau Selector section below). The information obtained can include demographic information, credit score, payment history, credit balances, mortgage status, bankruptcy, income estimates, etc. This information is used within each of the patient segments to categorize the patient 106. According to one example embodiment, the Category is a user definable grouping of patients based on likelihood of payment. For example, the categories might be "Low" probability of payment, "Medium" and "High". Those in the low category might be further segregated into those unable to pay, those eligible for Medicaid, those eligible for charity care, etc. Each category has an associated confidence level or probability associated with it. For example, a healthcare facility might want the low category to have a 90% probability for not paying and the high category to have a 90% probability for paying.

Figure 2:
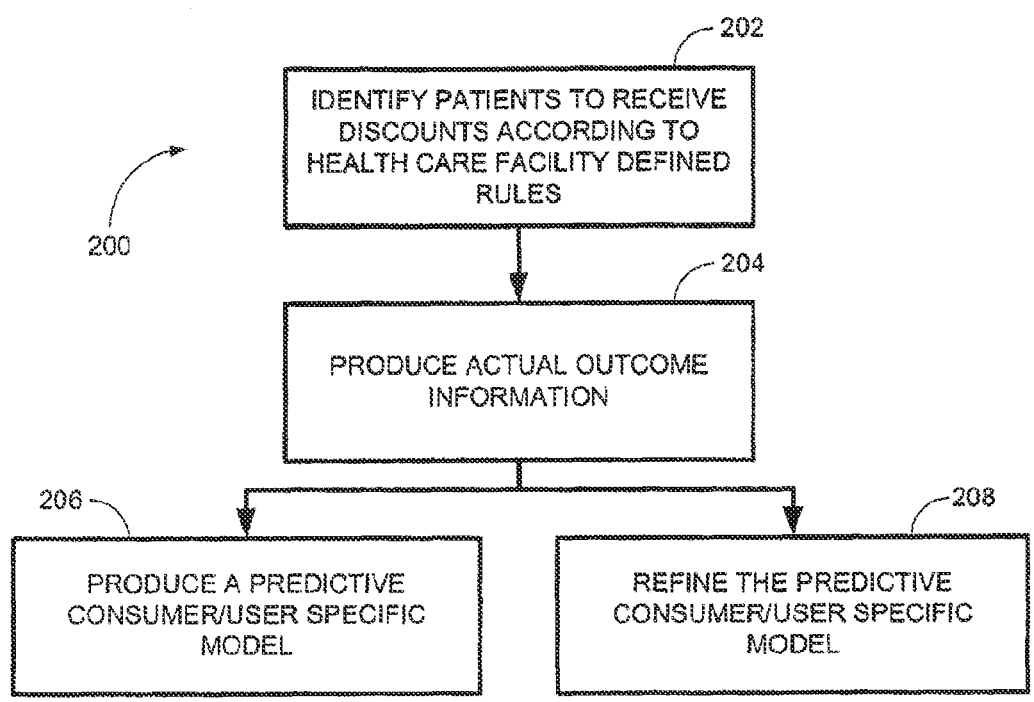
FIG. 2 illustrates a method according to an example embodiment.

Those unable to pay can, in some embodiments, also be offered a discount by the healthcare facility. These "Discounts for the Uninsured" can, or indeed in some cases must, be applied in a consistent manner across the patient population. According to one example embodiment, illustrated in FIG. 2, the method 200 and computing system identifies these patients and uses healthcare facility defined rules to determine which patients are entitled to discounts 202. For example, the healthcare facility can decide that those patients with household size of 4 whose incomes are twice the Federal Poverty Guidelines Limit (FPGL) are entitled to a 75% discount and those that are at the FPGL are entitled to a 100% discount. According to another example embodiment, the method and computing system uses an estimate of a patient's income based credit attributes and an estimate of household size based on marketing/demographic data to determine discount eligibility.

In some example embodiments, periodically a healthcare organization using the credit assessment method and system will produce actual outcomes information 204 that can be used to refine the model. The outcomes information will consist of whether the patient paid their bill, how long it took to pay, how their bill was paid, etc. The model can therefore be adjusted to more accurately predict payment based on actual experience on a periodic basis or from time to time.

These categories, probabilities, patient segmenting variables, and financial information are combined with actual outcomes data to produce a highly predictive customer/user specific model 206. This outcomes feedback process is continued on a periodic basis (i.e. monthly) or at any other desired non-periodic interval in order to continue to refine the model for a particular patient population. This is also important since small or large changes in a healthcare facility's workflow can impact the outcomes (i.e. if a healthcare facility is more aggressive in collecting co-pays during registration, more will be collected causing the financial information thresholds to need to be adjusted). These changes can be accounted for in the model by continually feeding outcomes information back 208.

Bureau Selector

Figure 3:
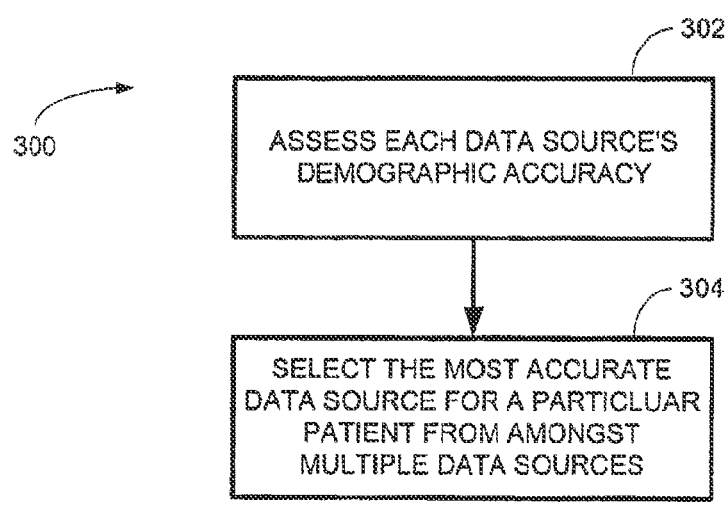
FIG. 3 illustrates a method according to an example embodiment.

According to another embodiment, illustrated in FIG. 3, a method 300 and computing systems provide for improving the accuracy of credit assessment or rating results by selecting the most accurate data source from amongst multiple data sources 304 (called the "Bureau Selector"). Each data source (e.g. credit bureau or other source of credit data) has regional strengths and weaknesses, especially in the accuracy of demographic information. According to one example embodiment, the most accurate demographic information can be obtained from the most accurate data source in a region. Accordingly, methods 300 and computing systems assess a data source's demographic accuracy 302.

The type of information that is gathered by a credit bureau is protected by multiple laws (GLB and FCRA). The information can only be used for a "permissible purpose" under the law, which includes things like collections and account review. It is not typically permissible to randomly select credit files and call people to see if the information is accurate. Instead, the accuracy must be measured as a by-product of a permissible transaction. For example, in the course of pursuing collections with an account, information in the credit report can be validated.

According to one example embodiment, the accuracy of a bureau's data is assessed 302 by using the outcomes information that is recorded by a customer/user of the credit assessment method and system. For example, Healthcare facility A is a customer/user. They use credit report information from different credit bureaus (via the above described method and system) for a permissible purpose (collections). According to one example embodiment, if an account is paid, either partially or in full, then the demographic information can be deemed to be valid because the healthcare facility was able to contact the patient either via the address or phone. If the healthcare facility receives returned mail, then the demographic information can be deemed not valid since the address did not work.

According to another example embodiment the method 300 and system assesses each data source 302 in each geographic region by looking at the first 3 digits of a patient's zip code (called an SCF). Each zip code SCF can be seeded with an initial bureau ordering (presumed strengths gleaned from external sources or the data sources themselves). As each transaction occurs and the method and system receives outcomes information, points for or against a bureau are awarded based on whether a data sources data resulted in a patient paying their bill. In this way, the ordering of data sources in a particular geography (SCF) can continually be adjusted.

It is emphasized that the Abstract is provided to comply with 37 C.F.R. .sctn.1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this inventive subject matter can be made without departing from the principles and scope of the inventive subject matter as expressed in the subjoined claims.

What is claimed is:

1. A computing system comprising:
   one or more processors configured to execute instructions, wherein the instructions are configured to cause the computing system to:
   receive attribute information for a patient of a healthcare facility;
   determine a patient population segment for the patient based at least in part on the received attribute information and a custom model for the healthcare facility, wherein the custom model groups patients of the healthcare facility based on attributes of the patients of the healthcare facility; and generate a prediction of payment for the patient based at least in part on the determined patient population segment.

2. The computing system of claim 1, wherein the instructions are further configured to cause the computing system to:
determine whether additional financial information would increase the accuracy of the prediction of payment; and
in response to determining that additional financial information would increase the accuracy of the prediction of payment:
access one or more financial information sources to obtain at least some of the additional financial information;
determine one or more patient categories for the patient based on the at least some of the additional financial information; and
update the prediction of payment for the patient based at least in part on the one or more determined patient categories.

3. The computing system of claim 1, wherein the instructions are further configured to cause the computing system to:
determine whether the patient is eligible for a discount based at least in part on the prediction of payment for the patient and one or more rules defined by the healthcare facility.

4. The computing system of claim 2, wherein the instructions are further configured to cause the computing system to at least:
determine whether the patient is eligible for a discount based at least in part on an estimated income of the patient and an estimated household size of the patient.

5. The computing system of claim 4, wherein the estimated income of the patient is based on additional financial information accessed from one or more financial information sources.

6. The computing system of claim 4, wherein the estimated household size of the patient is based on marketing demographic data.

7. The computing system of claim 1, wherein the instructions are further configured to cause the computing system to at least:
access actual patient payment outcome information for the healthcare facility; and
update a custom payment prediction model configured to segment patients of the healthcare facility, wherein the updating is based at least in part on the actual patient payment outcome information.

8. The computing system of claim 7, wherein the actual patient payment outcome information for the healthcare facility includes at least one of an indication of whether the patient paid, an indication of how long it took the patient to pay, or a method of payment.

9. The computing system of claim 2, wherein the one or more financial information sources are accessed based on accuracy of data stored by respective financial information sources.

10. The computing system of claim 9, wherein the accuracy of data stored by respective financial information sources is based at least in part on accuracy of regional or demographic information stored by the respective financial information sources.

11. The computing system of claim 1, wherein determining the patient population segment for the patient is based at least in part on segmentation variables of the healthcare facility.

12. A method comprising:
accessing, by a computing system having one or more hardware processors, attribute information for a patient of a healthcare facility;
determining, by the computing system, a patient population segment for the patient based at least in part on the attribute information and a custom model for the healthcare facility, wherein the custom model is configured to group patients of the healthcare facility based on attributes of the patients of the healthcare facility; and
generating, by the computing system, a prediction of payment for the patient based at least in part on the determined patient population segment.

13. The method of claim 12, wherein determining the patient population segment for the patient is based at least in part on segmentation variables of the healthcare facility.

14. The method of claim 12, further comprising:
accessing, by the computing system, actual patient payment outcome information for the healthcare facility; and
updating, by the computing system, a custom payment prediction model configured to segment patients of the healthcare facility, wherein the updating is based at least in part on the actual patient payment outcome information.

15. The method of claim 12, further comprising:
determining, by the computing system, whether additional financial information would increase accuracy of the prediction of payment; and
in response to determining that additional financial information would increase the accuracy of the prediction of payment:
accessing, by the computing system, one or more financial information sources to obtain at least some of the additional financial information;
determining, by the computing system, one or more patient categories for the patient based on the at least some of the additional financial information; and
updating, by the computing system, the prediction of payment for the patient based at least in part on the one or more determined patient categories.

16. The method of claim 15, wherein the one or more financial information sources are accessed based on accuracy of data stored by respective financial information sources.

17. Non-transitory computer storage having stored thereon computer-executable instructions configured for execution on a processing system to cause the processing system to:
access attribute information for a patient of a healthcare facility;
determine a patient population segment for the patient based at least in part on the attribute information and a custom model for the healthcare facility, wherein the custom model is configured to group patients of the healthcare facility based on attributes of the patients of the healthcare facility; and
generate a prediction of payment for the patient based at least in part on the determined patient population segment.

18. The non-transitory computer storage of claim 17, wherein the computer-executable instructions are further configured to cause the processing system to:

determine whether the patient is eligible for a discount based at least in part on the prediction of payment for the patient and one or more rules defined by the healthcare facility.

19. The non-transitory computer storage of claim 17, wherein the computer-executable instructions are further configured to cause the processing system to:
determine whether the patient is eligible for a discount based at least in part on an estimated income of the patient and an estimated household size of the patient.

20. The non-transitory computer storage of claim 17, wherein the computer-executable instructions are further configured to cause the processing system to:
access actual patient payment outcome information for the healthcare facility; and
update a custom payment prediction model configured to segment patients of the healthcare facility, wherein the updating is based at least in part on the actual patient payment outcome information.

\* \* \* \* \*